US012654736B2

(12) United States Patent
Kume et al.

(10) Patent No.: US 12,654,736 B2
(45) Date of Patent: *Jun. 16, 2026

(54) AUTONOMOUS DRIVING CONTROL DEVICE AND COMPUTER READABLE MEDIUM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 134 days.

This patent is subject to a terminal disclaimer.

(21) Appl. No.: 18/584,394

(22) Filed: Feb. 22, 2024

(65) Prior Publication Data

US 2024/0190465 A1     Jun. 13, 2024

Related U.S. Application Data

(63) Continuation of application No. PCT/JP2022/027545, filed on Jul. 13, 2022.

(30) Foreign Application Priority Data

Aug. 27, 2021    (JP) ................................. 2021-139313

(51) Int. Cl.
*B60W 60/00*        (2020.01)
*B60W 30/16*        (2020.01)
*B60W 50/14*        (2020.01)
(52) U.S. Cl.
CPC .......... *B60W 60/001* (2020.02); *B60W 30/16* (2013.01); *B60W 50/14* (2013.01); (Continued)

(58) Field of Classification Search
CPC .... B60W 60/001; B60W 30/16; B60W 50/14; B60W 2552/53; B60W 2754/30; B60W 2554/80
See application file for complete search history.

(56) References Cited

U.S. PATENT DOCUMENTS 10,814,885 B1 * 10/2020 Tang ...................... G08G 1/166
10,896,606 B1 *  1/2021 Hayes .................. G05D 1/0022
(Continued)

FOREIGN PATENT DOCUMENTS

JP          2005324661 A      11/2005
JP          2011143744 A       7/2011
(Continued)

OTHER PUBLICATIONS

2020 Honda Legend Honda Sensing Elite Owner's manual p. 350-351.

*Primary Examiner* — Dale W Hilgendorf
*Assistant Examiner* — Hana Lee
(74) *Attorney, Agent, or Firm* — Harness, Dickey & Pierce, P.L.C.

(57) ABSTRACT

A lane marking recognition unit recognizes left and right lane markings of a subject vehicle lane in which a subject vehicle travels. A departure determination unit determines departure of a surrounding vehicle traveling in the subject vehicle lane. A continuation determination unit determines whether continuation of the autonomous travel control based on information on the lane markings is possible, when departure occurs in the surrounding vehicle, in a state where the subject vehicle travels with autonomous travel control in which a driver has no surroundings monitoring obligation. A control continuation unit continues the autonomous travel control based on the information on the lane markings, when
(Continued)

continuation of the autonomous travel control based on the information on the lane markings is possible.

6 Claims, 13 Drawing Sheets

(52) U.S. Cl.
CPC ..... *B60W 2552/53* (2020.02); *B60W 2554/80* (2020.02); *B60W 2754/30* (2020.02)

(56) References Cited

U.S. PATENT DOCUMENTS

| | | | | |
|---|---|---|---|---|
| 2017/0225682 | A1* | 8/2017 | Schunk | ................... B60L 15/38 |
| 2017/0225686 | A1* | 8/2017 | Takaso | ................ B60W 30/165 |
| 2019/0077459 | A1* | 3/2019 | Miura | ................. B62D 15/025 |
| 2019/0344714 | A1* | 11/2019 | Shen | ..................... B60W 50/14 |
| 2020/0079368 | A1 | 3/2020 | Yamada et al. | |
| 2020/0108827 | A1* | 4/2020 | Kanoh | ................. B60W 30/12 |
| 2022/0063677 | A1* | 3/2022 | Sekine | ................. B60W 40/08 |
| 2022/0379959 | A1* | 12/2022 | Kosuge | ............. G01C 21/3697 |

FOREIGN PATENT DOCUMENTS

| | | | |
|---|---|---|---|
| JP | 2017111681 | A | 6/2017 |
| JP | 2017137001 | A | 8/2017 |
| JP | 2018195301 | A | 12/2018 |
| WO | WO-2018173403 | A1 | 9/2018 |

* cited by examiner

AUTONOMOUS DRIVING CONTROL DEVICE AND COMPUTER READABLE MEDIUM

CROSS REFERENCE TO RELATED APPLICATION

The present application is a continuation application of International Patent Application No. PCT/JP2022/027545 filed on Jul. 13, 2022, which designated the U.S. and claims the benefit of priority from Japanese Patent Application No. 2021-139313 filed on Aug. 27, 2021. The entire disclosures of all of the above applications are incorporated herein by reference.

TECHNICAL FIELD

The present disclosure relates to an autonomous driving control device and a non-transitory computer readable medium.

BACKGROUND

A vehicle control device that causes a vehicle to perform autonomous driving has been developed.

SUMMARY

According to an aspect of the present disclosure, an autonomous driving control device is configured to allow a subject vehicle to travel with autonomous travel control in which a driver has no surroundings monitoring obligation.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
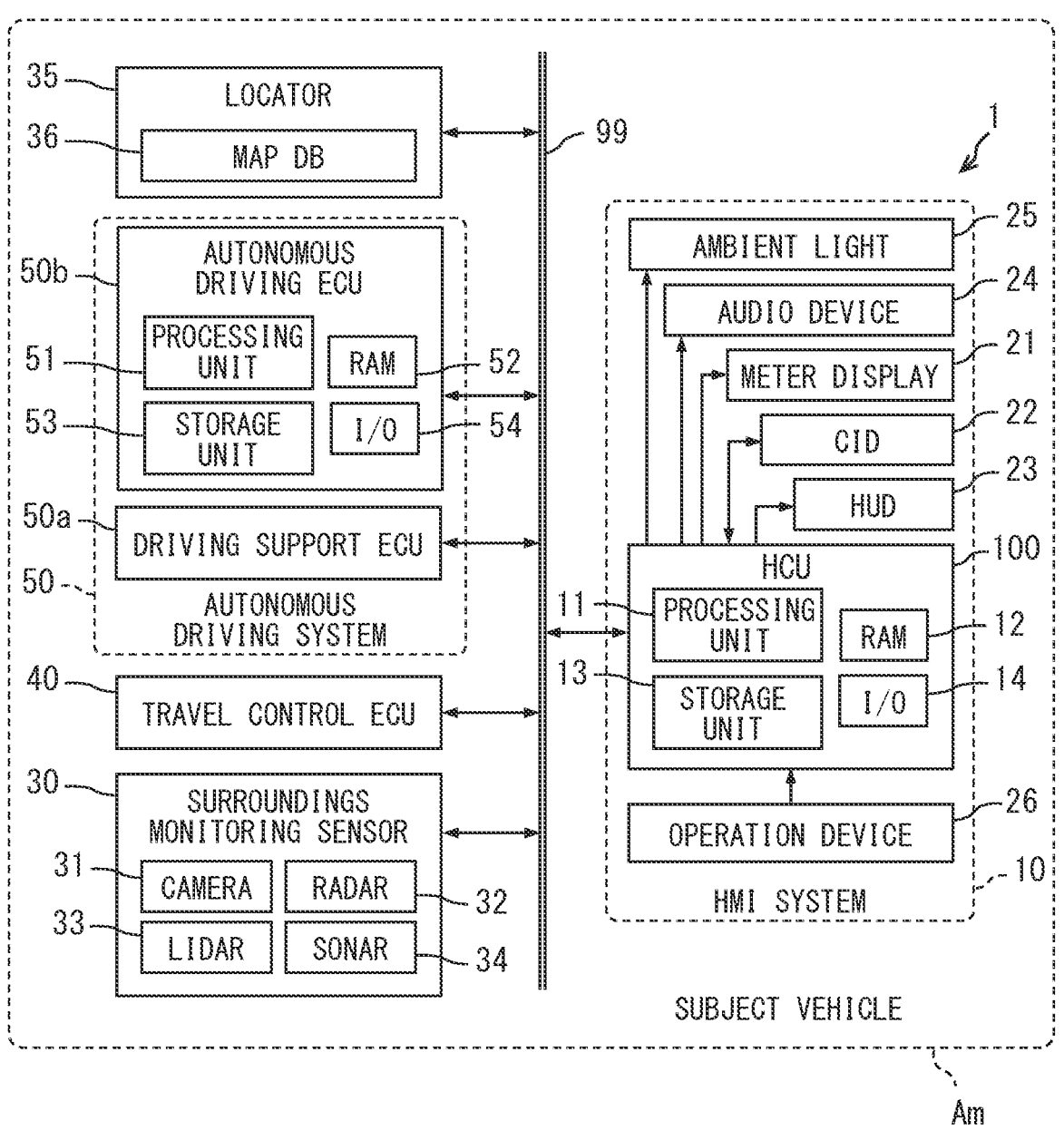
FIG. 1 is a diagram illustrating an overview of an in-vehicle network including an autonomous driving ECU according to a first embodiment of the present disclosure.

Hereinafter, examples of the present disclosure will be described.

According to an example of the present disclosure, a vehicle control device starts autonomous driving when traffic congestion having a length equal to or greater than a predetermined value occurs.

A technique has been considered that enables not only autonomous driving in which a driver has a surroundings monitoring obligation but also autonomous driving in which a driver does not have a surroundings monitoring obligation. Such autonomous driving in which the driver has no surroundings monitoring obligation may not be continued when an abnormality occurs in a traveling state of surrounding vehicles traveling in front of and behind a subject vehicle, for example, when the surrounding vehicles travel in a state of being deviated in the same direction in the lane. Such interruption of the autonomous driving may impair convenience for the driver or the like.

According to an example of the present disclosure, an autonomous driving control device is configured to allow a subject vehicle to travel with autonomous travel control in which a driver has no surroundings monitoring obligation. The autonomous driving control device comprises:

a lane marking recognition unit configured to recognize left and right lane markings of a subject vehicle lane in which the subject vehicle travels;

a departure determination unit configured to determine departure of a surrounding vehicle traveling in the subject vehicle lane;

a continuation determination unit configured to determine whether continuation of the autonomous travel control based on information on the lane markings is possible, when the surrounding vehicle departs in a state where the subject vehicle travels with the autonomous travel control; and a control continuation unit configured to, when continuation of the autonomous travel control based on the information on the lane markings is possible, continue the autonomous travel control based on the information on the lane markings.

According to an example of the present disclosure, an autonomous driving control device is configured to allow a subject vehicle to travel with autonomous travel control in which a driver has no surroundings monitoring obligation. The autonomous driving control device comprises:

a departure determination unit configured to determine departure of surrounding vehicles traveling in front of and behind the subject vehicle in a subject vehicle lane in which the subject vehicle travels; and a control continuation unit configured to change a position of the subject vehicle in a left-right direction inside the subject vehicle lane between a position in a case where both surrounding vehicles traveling in front of and behind the subject vehicle depart and where departure directions of left and right of the surrounding vehicles are the same and a position in a case where both the surrounding vehicles traveling in front of and behind the subject vehicle depart and where departure directions of left and right of the surrounding vehicles are different from each other, and continue the autonomous travel control.

In this aspect, even when the departure occurs in the surrounding vehicles in a state where the subject vehicle is traveling with autonomous travel control, as long as the autonomous travel control based on information on lane markings of the subject vehicle lane can be continued, the autonomous travel control is continued. According to the above, the interruption of the autonomous travel control caused by a change in behavior of the surrounding vehicles can be reduced. As a result, it is possible to use the autonomous driving, in which the driver has no surroundings monitoring obligation, for a longer time, and thus it is possible to secure the convenience of the autonomous driving.

According to an example of the present disclosure, a non-transitory computer readable medium stores a computer program configured to allow a subject vehicle to travel with autonomous travel control in which a driver has no surroundings monitoring obligation. The computer program comprises instructions configured to, when executed by the at least one processor, to cause the at least one processor to:

recognize left and right lane markings of a subject vehicle lane in which the subject vehicle travels;

determine departure of a surrounding vehicle traveling in the subject vehicle lane;

determine whether continuation of the autonomous travel control based on information on the lane markings is possible, when the surrounding vehicle departs in a state where the subject vehicle travels with the autonomous travel control; and continue the autonomous travel control based on the information on the lane markings, when continuation of the autonomous travel control based on the information on the lane markings is possible.

According to an example of the present disclosure, a non-transitory computer readable medium stores a computer program configured to allow a subject vehicle to travel with autonomous travel control in which a driver has no surroundings monitoring obligation. The computer program comprises instructions configured to, when executed by the at least one processor, to cause the at least one processor to:

determine departure of surrounding vehicles traveling in front of and behind the subject vehicle in a subject vehicle lane in which the subject vehicle travels;

change a position of the subject vehicle in a left-right direction inside the subject vehicle lane between a position in a case where both surrounding vehicles traveling in front of and behind the subject vehicle depart and where departure directions of left and right of the surrounding vehicles are the same, and a position in a case where both the surrounding vehicles traveling in front of and behind the subject vehicle depart and where departure directions of left and right of the surrounding vehicles are different from each other; and continue the autonomous travel control.

In this aspect, when surrounding vehicles in front of and behind the subject vehicle both depart, a position of the subject vehicle in a left-right direction inside the subject vehicle lane is changed between a position in a case where departure directions of left and right are the same and a position in a case where the departure directions of left and right are different from each other. According to the above, since a surrounding condition necessary for the autonomous travel control can be grasped, the interruption of the autonomous travel control can be reduced. As a result, it is possible to use the autonomous driving, in which the driver has no surroundings monitoring obligation, for a longer time, and thus it is possible to secure the convenience of the autonomous driving.

Hereinafter, multiple embodiments will be described with reference to the drawings. The same reference signs are assigned to corresponding components in the embodiments, and thus duplicate descriptions may be omitted. When only a part of a configuration is described in each embodiment, configurations in other embodiments described earlier can be applied to the other parts of the configuration. Further, in addition to combinations of configurations explicitly shown in the description of the embodiments, the configurations of the multiple embodiments can be partially combined even when the combinations are not explicitly shown as long as there is no problem in the combinations in particular.

First Embodiment

A function of an autonomous driving control device according to a first embodiment of the present disclosure is implemented by an autonomous driving electronic control unit (ECU) 50b illustrated in FIG. 1. The autonomous driving ECU 50b is mounted on a vehicle (hereinafter, referred to as a subject vehicle Am) together with a driving support ECU 50a. The autonomous driving ECU 50b constitutes an autonomous driving system 50 of the subject vehicle Am together with the driving support ECU 50a and the like. By mounting the autonomous driving system 50, the subject vehicle Am becomes an autonomous vehicle having an autonomous driving function and can travel by the autonomous driving function.

The driving support ECU 50a in the autonomous driving system 50 is an in-vehicle ECU that implements a driving support function for supporting a driving operation of a driver. The driving support ECU 50a enables partial autonomous driving or advanced driving support of about Level 2 of an autonomous driving level defined by the Society of Automotive Engineers. Autonomous driving performed by the driving support ECU 50a is autonomous driving in which the driver has a surroundings monitoring obligation and needs to monitor the surroundings of the subject vehicle by visual observation.

The autonomous driving ECU 50b is an in-vehicle ECU that implements an autonomous travel function capable of substituting a driving operation of the driver. The autonomous driving ECU 50b can perform autonomous travel of Level 3 or higher in which the system is a control subject. The autonomous driving performed by the autonomous driving ECU 50b is autonomous driving that does not require monitoring the surroundings of the subject vehicle, that is, eyes-off autonomous driving in which the driver has no surroundings monitoring obligation.

In the autonomous driving system 50, a control state of the autonomous driving function is switched between multiple types of control including at least autonomous driving control performed by the driving support ECU 50a in which the driver has a surroundings monitoring obligation and autonomous driving control performed by the autonomous driving ECU 50b in which the driver has no surroundings monitoring obligation. In the following description, the autonomous driving control of Level 2 or lower performed by the driving support ECU 50a is referred to as "driving support control", and the autonomous driving control of Level 3 or higher performed by the autonomous driving ECU 50b is referred to as "autonomous travel control". The autonomous driving ECU 50b may be capable of performing autonomous driving of Level 4 or higher.

During autonomous travel in which the subject vehicle Am travels with the autonomous travel control of the autonomous driving ECU 50b, the driver can be permitted to perform a specific act (hereinafter, referred to as a second task) other than predetermined driving. The driver is legally permitted to perform the second task until an execution request for a driving operation to be performed by the autonomous driving ECU 50*b* in coordination with a human machine interface control unit (HCU) 100 described later, that is, a request for a driving takeover is made. For example, acts such as viewing entertainment contents such as video contents, operating a device such as a smartphone or the like, and having a meal are assumed as the second task.

Figure 2:
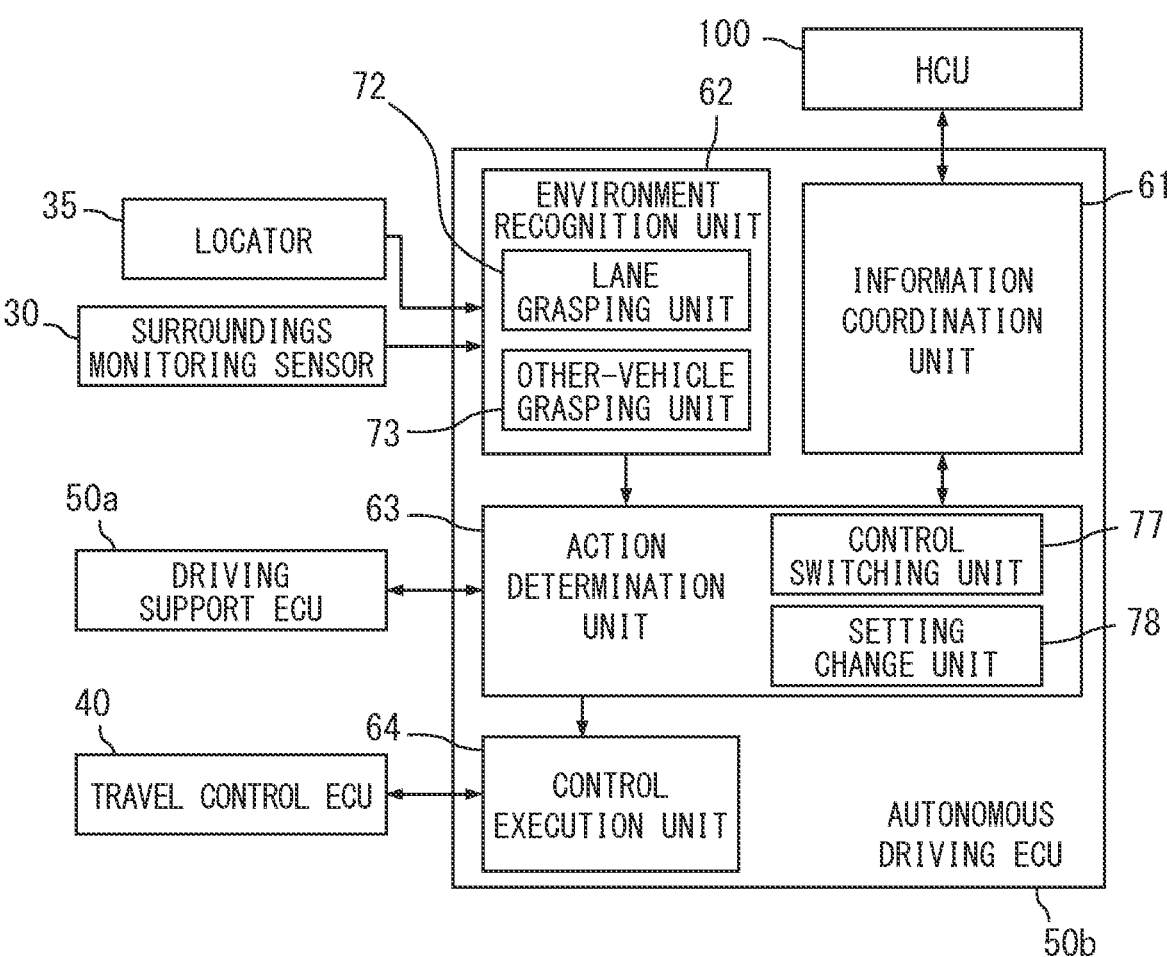
FIG. 2 is a block diagram illustrating details of the autonomous driving ECU.
Figure 3:
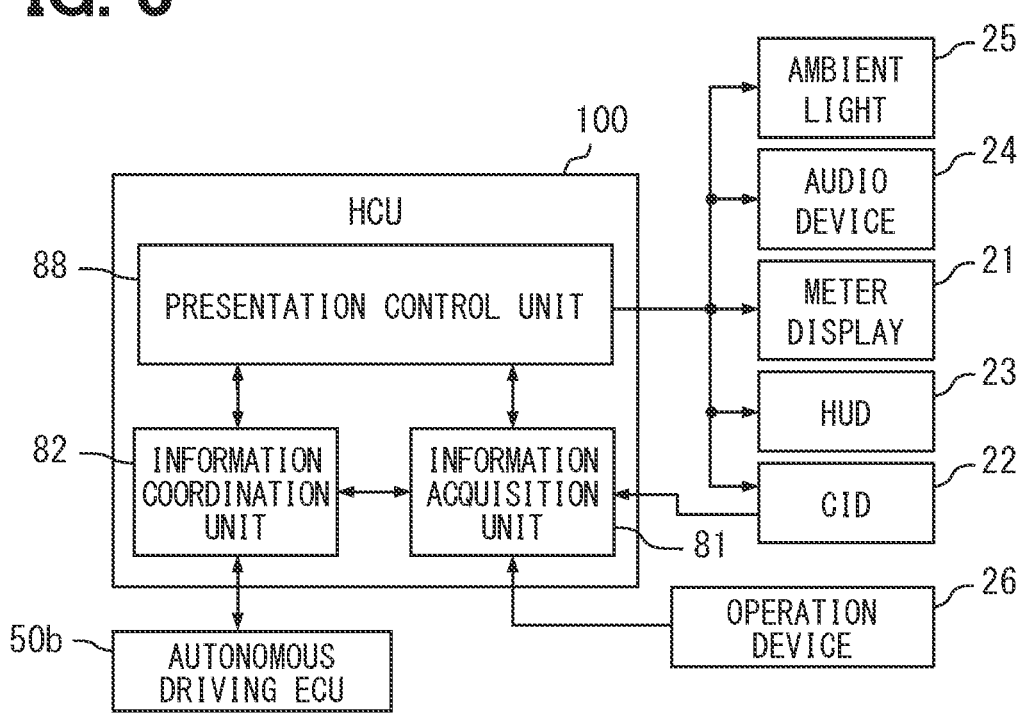
FIG. 3 is a block diagram illustrating details of an HCU.
Figure 4:
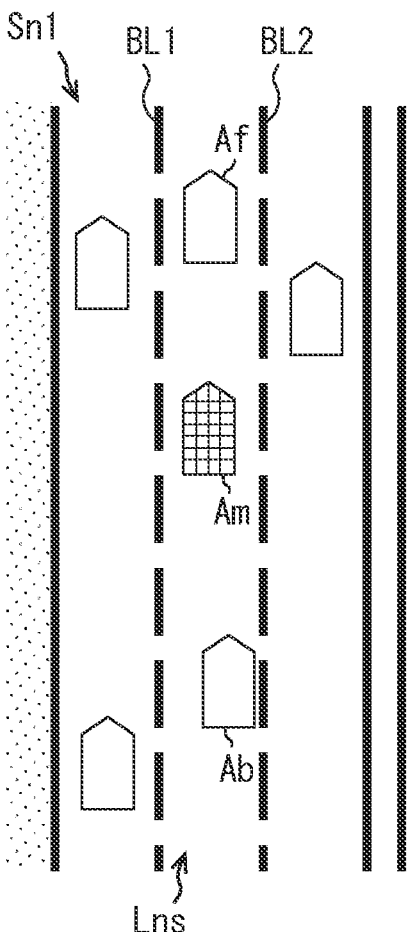
FIG. 4 is a diagram for explaining interruption avoidance control in a first departure scene.
Figure 5:
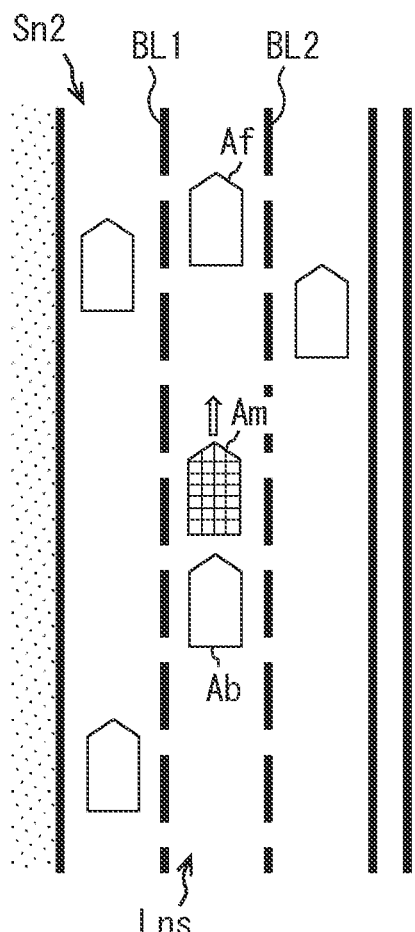
FIG. 5 is a diagram for explaining interruption avoidance control in a second departure scene.
Figure 6:
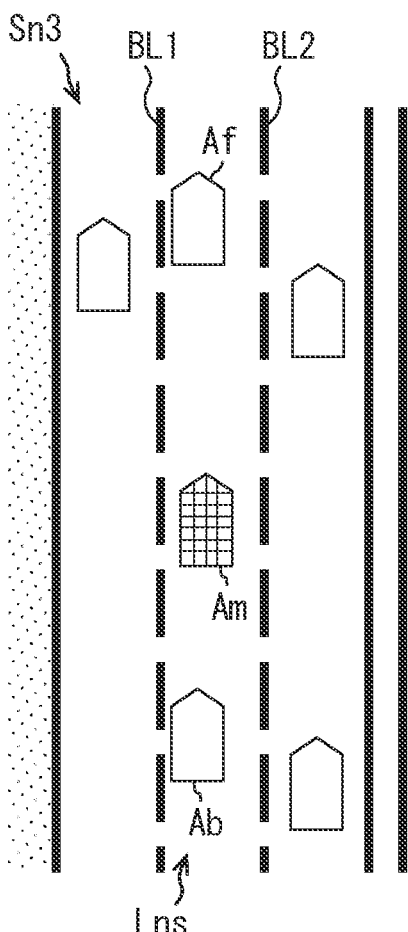
FIG. 6 is a diagram for explaining interruption avoidance control in a third departure scene.
Figure 7:
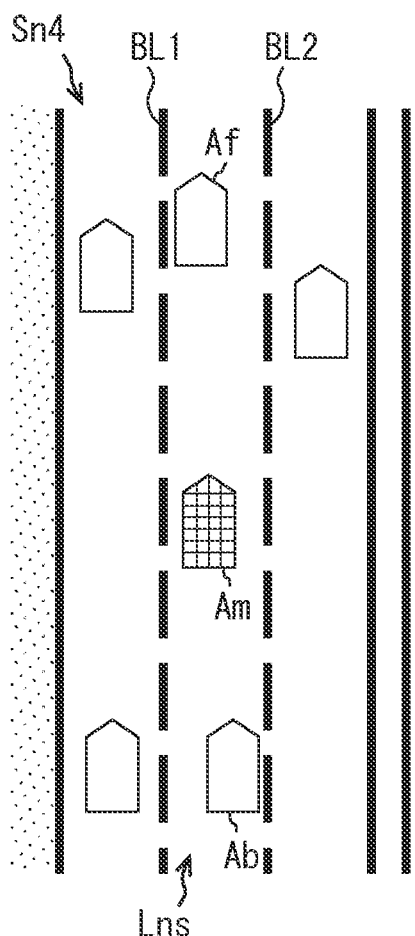
FIG. 7 is a diagram for explaining interruption avoidance control in a fourth departure scene.

The driving support ECU 50*a* and the autonomous driving ECU 50*b* are communicably connected to a communication bus 99 of an in-vehicle network 1 mounted on the subject vehicle Am. As illustrated in FIGS. 1 to 3, a surroundings monitoring sensor 30, a locator 35, a travel control ECU 40, the HCU 100, and the like are connected to the communication bus 99. These nodes connected to the communication bus 99 can communicate with each other. Specific nodes among the ECUs and the like may be directly electrically connected to each other and may communicate with each other without the communication bus 99.

The surroundings monitoring sensor 30 is an autonomous sensor configured to monitor a surrounding environment of the subject vehicle Am. The surroundings monitoring sensor 30 includes, for example, one or more of a camera unit 31, a millimeter-wave radar 32, a LIDAR 33, and a sonar 34. The surroundings monitoring sensor 30 can detect a moving object and a stationary object from a detection range around the subject vehicle. The surroundings monitoring sensor 30 provides detection information on an object around the subject vehicle to the driving support ECU 50*a*, the autonomous driving ECU 50*b*, and the like.

The locator 35 includes a global navigation satellite system (GNSS) receiver, an inertial sensor, and the like. The locator 35 combines positioning signals received from multiple positioning satellites by the GNSS receiver, a measurement result of the inertial sensor, vehicle speed information output to the communication bus 99, and the like, and sequentially measures a subject vehicle position, a traveling direction, and the like of the subject vehicle Am. The locator 35 includes a map database 36 that stores three-dimensional map data and two-dimensional map data. The locator 35 reads map data on the surroundings of a current position from the map database 36, and provides the read map data together with subject vehicle position information and direction information of the subject vehicle Am to the driving support ECU 50*a*, the autonomous driving ECU 50*b*, and the like as locator information.

The travel control ECU 40 is an electronic control device mainly including a microcontroller. The travel control ECU 40 has at least functions of a brake control ECU, a drive control ECU, and a steering control ECU. The travel control ECU 40 continuously performs braking force control of each wheel, output control of an in-vehicle power source, and steering angle control based on any one of an operation command based on the driving operation of the driver, a control command of the driving support ECU 50*a*, and a control command of the autonomous driving ECU 50*b*.

The HCU 100 constitutes a human machine interface (HMI) system 10 together with multiple display devices, an audio device 24, an ambient light 25, an operation device 26, and the like. The HMI system 10 has an input interface function of receiving an operation performed by an occupant such as the driver of the subject vehicle Am, and an output interface function of presenting information to the driver.

The display device presents information through the visual sense of the driver by image display or the like. The display device includes a meter display 21, a CID 22, a head-up display (hereinafter referred to as HUD) 23, and the like. The CID 22 has a function of a touch panel, and detects a touch operation on a display screen performed by the driver or the like.

The audio device 24 includes multiple speakers installed in a vehicle interior in a manner of surrounding a driver's seat, and causes the speakers to reproduce a notification sound, a voice message, or the like in the vehicle interior. The ambient light 25 is provided on an instrument panel, a steering wheel, and the like. The ambient light 25 presents information using a peripheral visual field of the driver by ambient display that changes an emission color.

The operation device 26 is an input unit configured to receive a user operation performed by the driver or the like. For example, user operations related to activation and stop of the autonomous driving function are input to the operation device 26. As an example, a driver input instructing a transition from the driving support control to the autonomous travel control is input to the operation device 26. The operation device 26 includes a steering switch provided on a spoke portion of the steering wheel, an operation lever provided on a steering column portion, a voice input device for recognizing utterance contents of the driver, and the like.

The HCU 100 functions as a presentation control device and integrally controls presentation of information related to autonomous driving or the like to the driver. The HCU 100 requests a driving takeover of the driver, based on an execution request for a driving operation based on the autonomous driving ECU 50*b*. In addition, the HCU 100 can coordinate with the autonomous driving ECU 50*b* to allow the driver performing the second task, and reproduce video contents and the like related to the second task in a manner that does not interfere with a driving takeover request.

The HCU 100 is a computer mainly including a control circuit. The control circuit includes a processing unit 11, a RAM 12, a storage unit 13, an input and output interface 14, a bus connecting these units, and the like. The processing unit 11 executes various types of processing for presentation control processing by accessing the RAM 12. The RAM 12 may include a video RAM for generating video data. The storage unit 13 includes a nonvolatile storage medium. The storage unit 13 stores various programs (such as a presentation control program) to be executed by the processing unit 11. The HCU 100 constructs multiple functional units by the processing unit 11 executing the programs stored in the storage unit 13. Functional units such as an information acquisition unit 81, an information coordination unit 82, and a presentation control unit 88 are constructed in the HCU 100 (see FIG. 3).

The information acquisition unit 81 acquires operation information indicating contents of a user operation from the CID 22, the operation device 26, and the like. The information acquisition unit 81 provides operation information on a user operation related to the autonomous driving function to the information coordination unit 82.

The information coordination unit 82 coordinates with an information coordination unit 61 (described later) of the autonomous driving ECU 50*b* and enables sharing of information between the autonomous driving system 50 and the HCU 100. The information coordination unit 82 provides the operation information and the like grasped by the information acquisition unit 81 to the autonomous driving ECU 50*b*. In addition, the information coordination unit 82 grasps an operating state of the autonomous driving based on the autonomous driving system 50 by acquiring control status information indicating a state of the autonomous driving function. Further, the information coordination unit 82 acquires an execution request of a driving takeover request to the driver, an execution request for a control transition notification, and the like from the autonomous driving ECU 50*b*. The information coordination unit 82 controls contents and execution timings of the notifications in coordination with the presentation control unit 88 based on the execution requests for the notifications.

Figure 8:
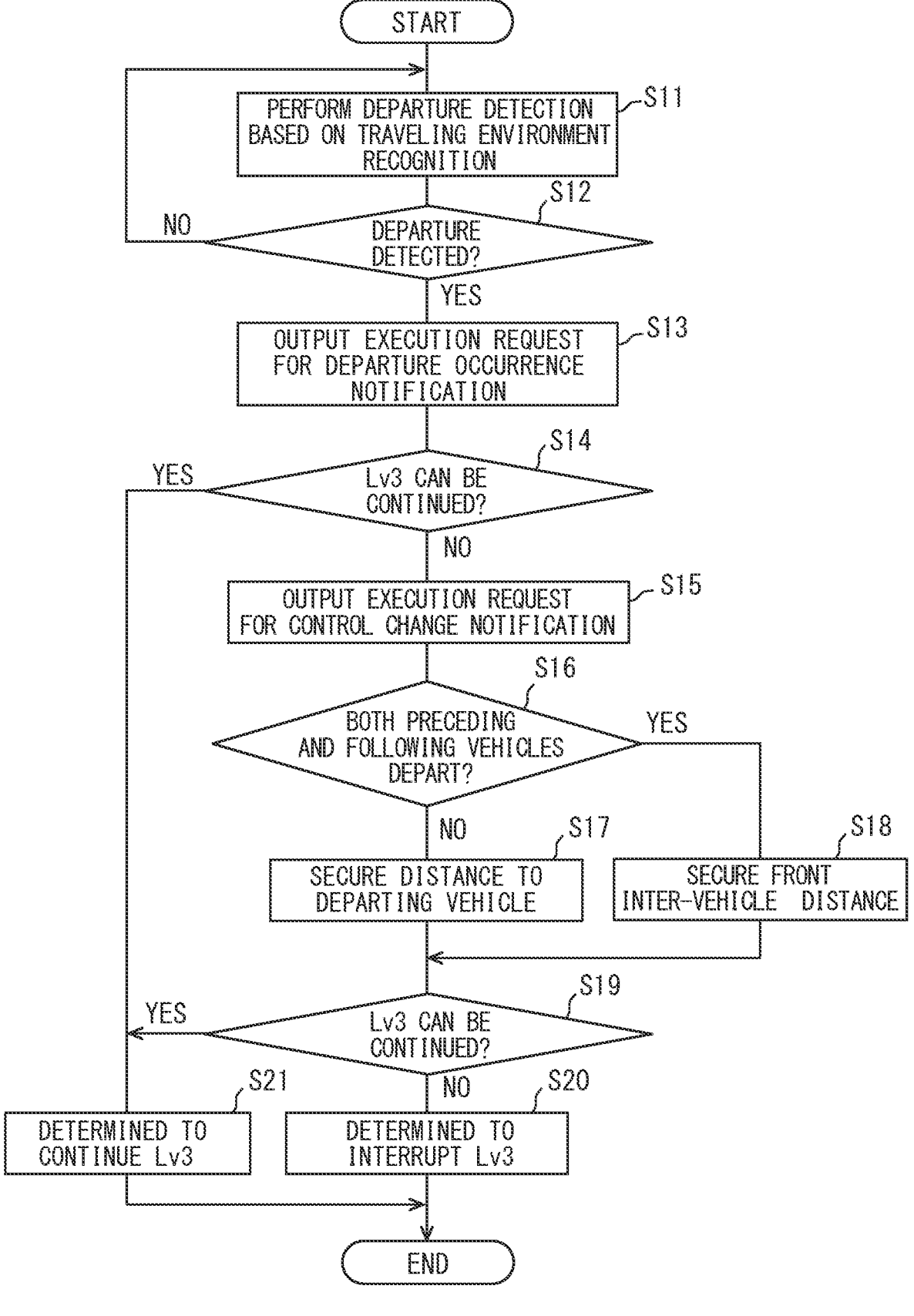
FIG. 8 is a flowchart illustrating details of departure handling processing.
Figure 9:
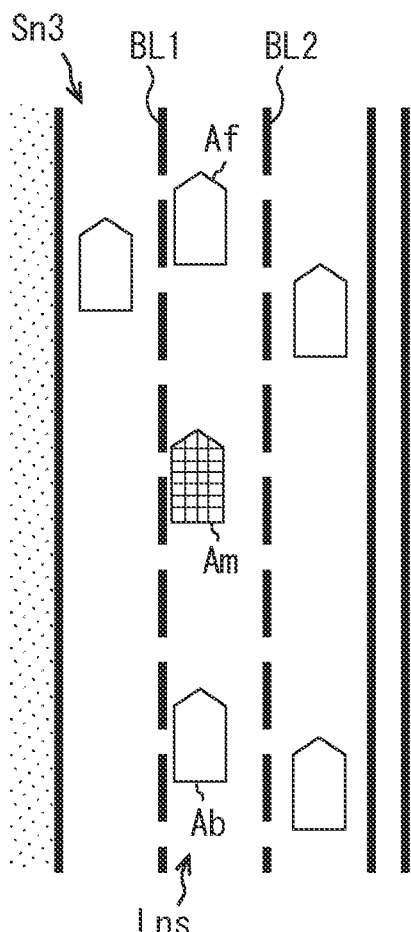
FIG. 9 is a diagram for explaining position adjustment control in the third departure scene performed in a second embodiment.
Figure 10:
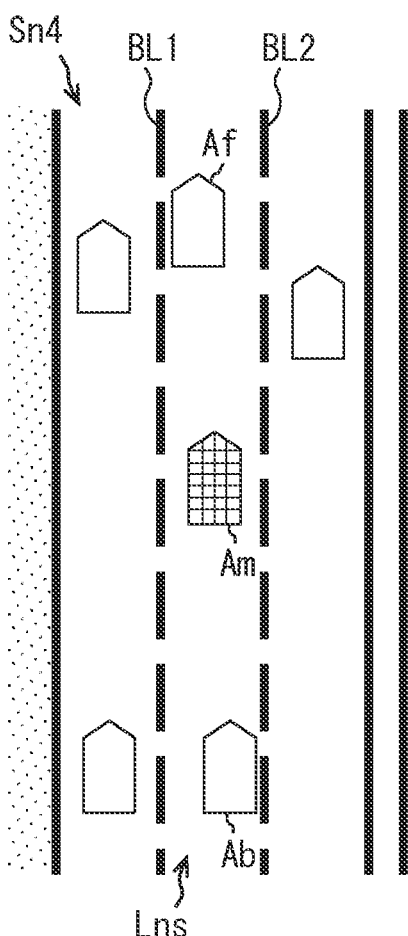
FIG. 10 is a diagram for explaining position adjustment control in the fourth departure scene.
Figure 11:
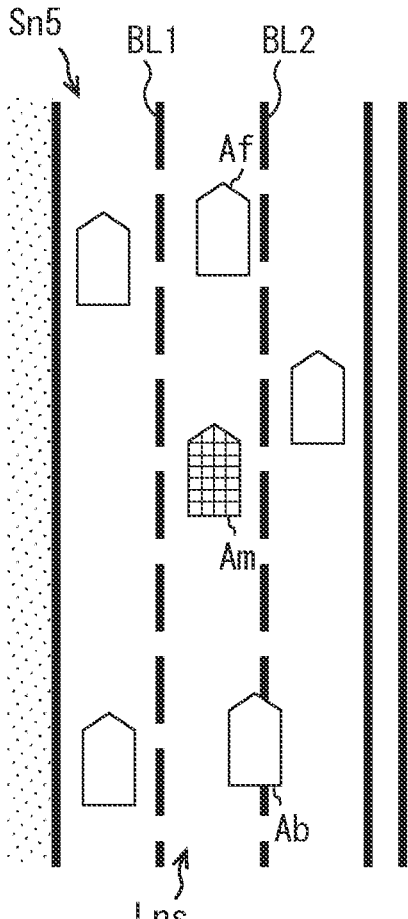
FIG. 11 is a diagram for explaining position adjustment control in a fifth departure scene.
Figure 12:
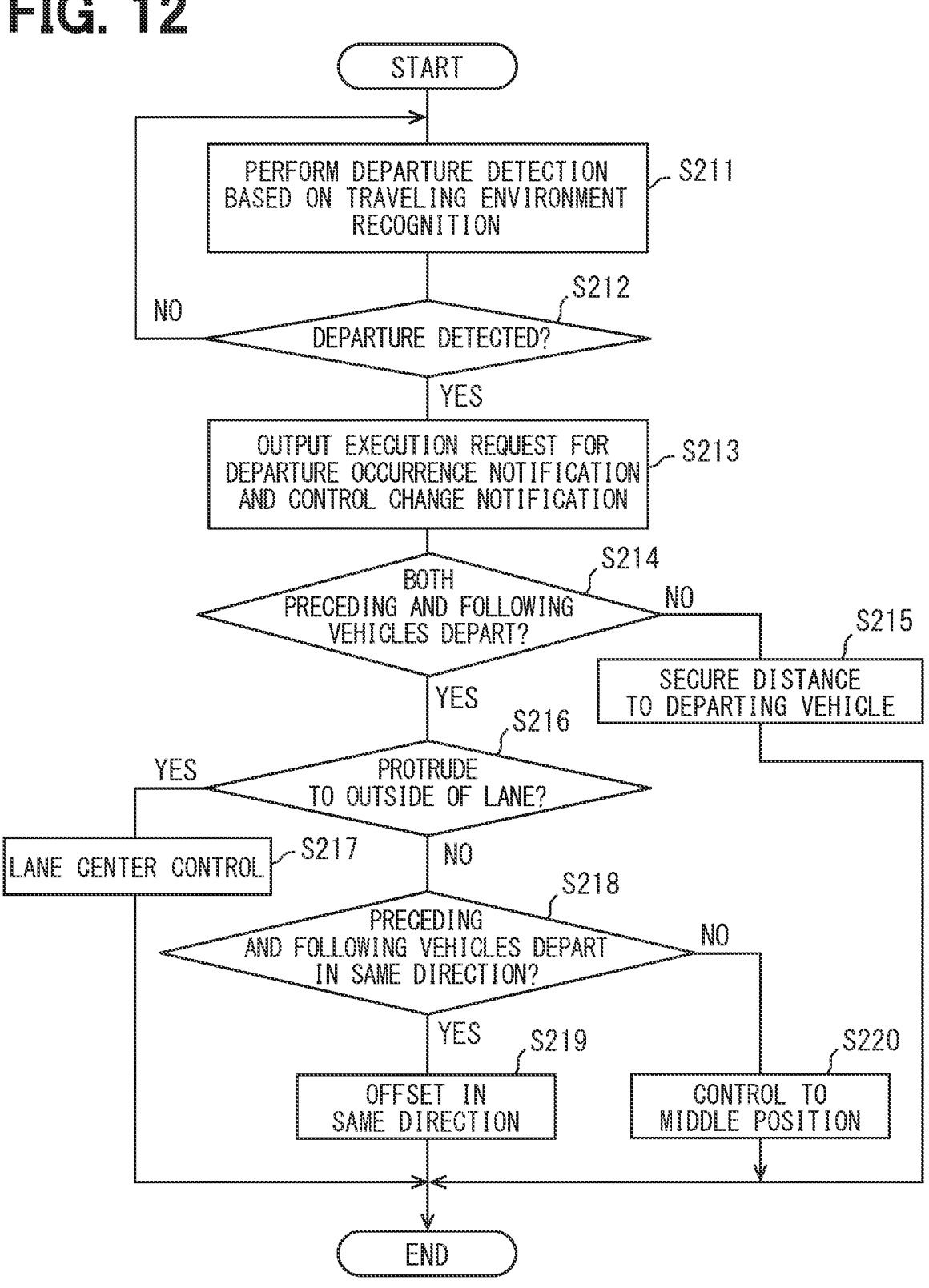
FIG. 12 is a flowchart illustrating details of the departure handling processing.

The presentation control unit 88 integrally provides information to the driver using the display devices, the audio device 24, the ambient light 25, and the like. The presentation control unit 88 performs content provision and information presentation in accordance with the operating state of the autonomous driving, based on the control status information and the execution request acquired by the information coordination unit 82. For example, when departure of a surrounding vehicle described later is detected, the presentation control unit 88 performs departure occurrence notification, control change notification, and the like based on the execution request from the autonomous driving ECU 50*b* (see FIG. 8).

Next, details of the driving support ECU 50*a* and the autonomous driving ECU 50*b* will be described in order.

The driving support ECU 50*a* is a computer mainly including a control circuit. The control circuit includes a processing unit, a RAM, a storage unit, an input and output interface, a bus connecting these units, and the like. The driving support ECU 50*a* implements driving support functions such as adaptive cruise control (ACC) and lane trace control (LTC) by the processing unit executing programs. As an example, the driving support ECU 50*a* performs driving support control for causing the subject vehicle Am to travel along a subject vehicle lane Lns, in which the subject vehicle Am is traveling, by coordination of the functions of the ACC and the LTC.

The autonomous driving ECU 50*b* has a greater arithmetic capacity than the driving support ECU 50*a*, and can perform at least travel control corresponding to the ACC, the LTC, and the like. The autonomous driving ECU 50*b* is a computer mainly including a control circuit. The control circuit includes a processing unit 51, a RAM 52, a storage unit 53, an input and output interface 54, a bus connects these units, and the like. The processing unit 51 accesses the RAM 52 to execute various types of processing for implementing an autonomous driving control method according to the present disclosure. The storage unit 53 stores various programs (such as an autonomous driving control program) to be executed by the processing unit 51. By the execution of the programs by the processing unit 51, an information coordination unit 61, an environment recognition unit 62, an action determination unit 63, a control execution unit 64, and the like are constructed in the autonomous driving ECU 50*b* as multiple functional units for implementing the autonomous driving function (see FIG. 2).

The information coordination unit 61 provides information to the information coordination unit 82 of the HCU 100 and acquires information from the information coordination unit 82. By coordination of the information coordination units 61 and 82, the autonomous driving ECU 50*b* and the HCU 100 share information acquired by each other. The information coordination unit 61 generates control status information indicating the operating state of the autonomous driving function and provides the generated control status information to the information coordination unit 82. In addition, the information coordination unit 61 enables the HCU 100 to perform notification in synchronization with the operating state of the autonomous driving function, by outputting a notification execution request to the information coordination unit 82. Meanwhile, the information coordination unit 61 acquires operation information of the driver and the like from the information coordination unit 82. The information coordination unit 61 grasps contents of the user operation input to the HMI system 10 or the like, based on the operation information.

The environment recognition unit 62 combines the locator information acquired from the locator 35 and the detection information acquired from the surroundings monitoring sensor 30, and recognizes a traveling environment of the subject vehicle Am. Specifically, the environment recognition unit 62 grasps information related to a road on which the subject vehicle Am travels, a relative position and a relative speed of a moving object (a surrounding vehicle or the like) around the subject vehicle, and the like. In addition, the environment recognition unit 62 acquires vehicle information indicating a state of the subject vehicle Am from the communication bus 99. As an example, the environment recognition unit 62 acquires vehicle speed information indicating a current traveling speed of the subject vehicle Am.

The environment recognition unit 62 recognizes traffic congestion around the subject vehicle Am by combining information on other vehicles around the subject vehicle, the vehicle speed information, and the like. As an example, when the current traveling speed of the subject vehicle Am is equal to or lower than a traffic congestion speed (for example, about 30 km/h) and there are other vehicles traveling in front of and behind the subject vehicle Am in the same lane as the subject vehicle Am, the environment recognition unit 62 determines that the surroundings of the subject vehicle Am are in a traffic congestion state. In addition, the environment recognition unit 62 determines whether the road on which the subject vehicle Am travels or a road on which the subject vehicle Am is scheduled to travel is an autonomous-driving-allowed area (hereinafter, referred to as an AD area) or a restricted AD area set in advance. The AD area or the restricted AD area is set to, for example, a highway including an automobile road and the like.

The action determination unit 63 coordinates with the driving support ECU 50*a* and the HCU 100 to control driving takeover between the autonomous driving system 50 and the driver. In addition, when the autonomous driving ECU 50*b* has a control right of the driving operation, the action determination unit 63 generates a scheduled traveling line, along which the subject vehicle Am travels, based on a recognition result of the traveling environment obtained by the environment recognition unit 62, and outputs the generated scheduled traveling line to the control execution unit 64.

The action determination unit 63 includes a control switching unit 77 as a sub-function unit for controlling the operating state of the autonomous driving function. The control switching unit 77 coordinates with the driving support ECU 50*a* and switches between the driving support control in which the driver has a surroundings monitoring obligation and the autonomous travel control in which the driver has no surroundings monitoring obligation. In addition, when the subject vehicle Am is caused to travel with the autonomous travel control, the control switching unit 77 switches a control mode of the autonomous travel control between multiple control modes. The control mode of the autonomous travel control includes at least traffic congestion exclusive control (hereinafter, referred to as a traffic congestion scene level 3) that is performed exclusively for traveling during traffic congestion and area exclusive control (hereinafter, referred to as an area level 3) that is performed exclusively for traveling in a specific area. The control switching unit 77 permits execution of the traffic congestion scene level 3 or the area level 3 on a road in the AD area, and permits execution of only the traffic congestion scene level 3 on a road in the restricted AD area. In a manual driving area (hereinafter, referred to as an MD area) that is not included in either the AD area or the restricted AD area, the control switching unit 77 basically prohibits travel performed according to the autonomous travel control of Level 3.

When the autonomous driving ECU 50b has the control right of the driving operation, the control execution unit 64 performs, in coordination with the travel control ECU 40, acceleration and deceleration control, steering control, and the like of the subject vehicle Am in accordance with the scheduled traveling line generated by the action determination unit 63. Specifically, the control execution unit 64 generates control commands based on the scheduled traveling line, and sequentially outputs the generated control commands to the travel control ECU 40.

Here, the autonomous travel control in which the driver has no surroundings monitoring obligation may be forcibly terminated when an abnormality occurs in a traveling state of surrounding vehicles traveling in front of and behind the subject vehicle Am in the same lane as the subject vehicle Am (hereinafter, referred to as the subject vehicle lane Lns). The autonomous driving ECU 50b according to the present disclosure controls the traveling state of the subject vehicle Am such that the autonomous travel control can be continued even when an abnormality occurs in the traveling state of the surrounding vehicle. Hereinafter, details of interruption avoidance control that can cope with the abnormality of the traveling state of the surrounding vehicle and avoid interruption of the autonomous travel control will be described. A front-rear direction and a left-right direction described below are defined with reference to the subject vehicle Am that is stationary on a horizontal surface.

The environment recognition unit 62 includes a lane grasping unit 72 and an other-vehicle grasping unit 73 as sub-function units related to traveling environment recognition.

The lane grasping unit 72 particularly grasps information on the subject vehicle lane Lns (see FIGS. 4 to 7) in information on a road on which the subject vehicle Am travels. The lane grasping unit 72 mainly recognizes left and right lane markings BL1 and BL2 that mark the subject vehicle lane Lns based on detection information of camera units 31 that image the front and rear of the subject vehicle Am. The lane grasping unit 72 grasps relative positions of the lane markings BL1 and BL2 and shapes of the lane markings BL1 and BL2 in the traveling direction, and specifies a range that is the subject vehicle lane Lns. The information on the lane markings BL1 and BL2 recognized by the lane grasping unit 72 is used by the action determination unit 63 to generate the scheduled traveling line.

The lane grasping unit 72 may recognize a roadside as a boundary of the subject vehicle lane Lns, instead of the lane markings BL1 and BL2. However, it is desirable that the autonomous travel control is performed exclusively on a road on which a section line substantially exists.

The other-vehicle grasping unit 73 grasps, in information related to a moving object around the subject vehicle, relative positions, relative speeds, and the like of a preceding vehicle Af and a following vehicle Ab (see FIGS. 4 to 7) traveling in front of and behind the subject vehicle Am in the subject vehicle lane Lns. In addition, the other-vehicle grasping unit 73 detects departure of the preceding vehicle Af and the following vehicle Ab.

More specifically, the other-vehicle grasping unit 73 determines departure in the front-rear direction of a surrounding vehicle based on approaching of the surrounding vehicle to the subject vehicle Am. For example, the other-vehicle grasping unit 73 sets a reference position of the surrounding vehicle in the front-rear direction with respect to the subject vehicle Am based on the traveling speed of the subject vehicle Am (or the surrounding vehicle). The other-vehicle grasping unit 73 sets reference positions in front and behind to a position farther from the subject vehicle Am as the traveling speed of the subject vehicle Am or the like increases. When the surrounding vehicle approaches the subject vehicle Am from the reference position beyond a predetermined range, the other-vehicle grasping unit 73 determines that the surrounding vehicle departs in the front-rear direction. The reference position in the front-rear direction is associated with, for example, a rear end of the preceding vehicle Af or a rear end of the following vehicle Ab.

As another example, the other-vehicle grasping unit 73 sets an approach determination distance of the surrounding vehicle in the front-rear direction with respect to the subject vehicle Am based on the traveling speed of the subject vehicle Am or the like. The other-vehicle grasping unit 73 sets the approach determination distance in the front-rear direction to be longer as the traveling speed of the subject vehicle Am or the like increases. When the surrounding vehicle in the front-rear direction approaches the subject vehicle Am beyond the approach determination distance, the other-vehicle grasping unit 73 determines that the surrounding vehicle departs in the front-rear direction.

Further, the other-vehicle grasping unit 73 determines departure in the left-right direction of a surrounding vehicle based on approaching of the surrounding vehicle to the left and right lane markings BL1 and BL2. As an example, the other-vehicle grasping unit 73 sets a reference position of the surrounding vehicle in the lane in the left-right direction based on position information on the left and right lane markings BL1 and BL2 recognized by the lane grasping unit 72. When the surrounding vehicle approaches the left lane marking BL1 or the right lane marking BL2 from the reference position beyond a predetermined range, the other-vehicle grasping unit 73 determines that the surrounding vehicle departs in the left-right direction. The reference position in the left-right direction may be associated with, for example, a left end or a right end of the surrounding vehicle, or may be associated with a center position of the surrounding vehicle in the left-right direction.

As another example, the other-vehicle grasping unit 73 sets an approach determination distance in the left-right direction with respect to each of the lane markings BL1 and BL2. When the surrounding vehicle in the front-rear direction approaches the lane marking BL1 or BL2 beyond the approach determination distance, the other-vehicle grasping unit 73 determines that the surrounding vehicle departs in the left-right direction. The reference position and the approach determination distance used for the departure determination in the left-right direction may be substantially constant regardless of the traveling speed of the subject vehicle Am.

The other-vehicle grasping unit 73 detects the departure of the surrounding vehicle in, for example, a first departure scene Sn1 to a fourth departure scene Sn4. In the first departure scene Sn1 (see FIG. 4), the following vehicle Ab is traveling at a position deviated in a right direction. In this case, the other-vehicle grasping unit 73 detects departure of the following vehicle Ab in the left-right direction (right direction). In the second departure scene Sn2 (see FIG. 5), the following vehicle Ab is abnormally approaching the subject vehicle Am. In this case, the other-vehicle grasping unit 73 detects departure of the following vehicle Ab in the front-rear direction (front direction). In the third departure scene Sn3 (see FIG. 6), the preceding vehicle Af and the following vehicle Ab are both traveling at positions deviated in a left direction. In this case, the other-vehicle grasping unit 73 detects departure of the preceding vehicle Af and the following vehicle Ab in the same direction (left direction). In the fourth departure scene Sn4 (see FIG. 7), the preceding vehicle Af and the following vehicle Ab are traveling at different positions deviated in the left-right direction. In this case, the other-vehicle grasping unit 73 detects departure of the preceding vehicle Af and the following vehicle Ab in different directions. The first departure scene Sn1 to the fourth departure scene Sn4 described above may be a traveling scene in traffic congestion or a traveling scene without traffic congestion.

The action determination unit 63 includes a setting change unit 78 in addition to the control switching unit 77 described above, as a sub-function unit for controlling the operating state of the autonomous travel control.

When departure occurs in at least one of the preceding vehicle Af and the following vehicle Ab while the subject vehicle Am is traveling according to the autonomous travel control, the control switching unit 77 determines whether the autonomous travel control based on the information on the lane markings BL1 and BL2 can be continued. When the control switching unit 77 determines that the autonomous travel control based on the information on the lane markings BL1 and BL2 cannot be continued, the control switching unit 77 instructs the setting change unit 78 to change the travel control. After the setting change unit 78 changes the travel control, the control switching unit 77 determines again whether the autonomous travel control based on the information on the lane markings BL1 and BL2 can be continued.

When it is determined, by the first continuation feasibility determination by the control switching unit 77 based on detection of departure of a surrounding vehicle, that the autonomous travel control based on the information on the lane markings BL1 and BL2 can be continued, the setting change unit 78 continues the autonomous travel control based on the information on the lane markings BL1 and BL2. On the other hand, when it is determined that the autonomous travel control based on the information on the lane markings BL1 and BL2 cannot be continued in the first continuation feasibility determination based on the detection of the departure of the surrounding vehicle, the setting change unit 78 changes a setting of the autonomous travel control. Specifically, the setting change unit 78 adjusts a parameter related to a traveling position of the subject vehicle Am inside the subject vehicle lane Lns among parameters used in the autonomous travel control. The setting change unit 78 changes the traveling position of the subject vehicle Am to move the subject vehicle Am away from a surrounding vehicle whose departure is detected, so that the recognition of the lane markings BL1 and BL2 is not obstructed by the surrounding vehicle.

Specifically, when only one of the preceding vehicle Af and the following vehicle Ab departs, the setting change unit 78 controls the travel of the subject vehicle Am so as to increase a space between the subject vehicle Am and the one surrounding vehicle that departs. For example, when only the departure of the preceding vehicle Af is detected, the setting change unit 78 controls the travel of the subject vehicle Am so as to increase a space between the preceding vehicle Af and the subject vehicle Am (hereinafter referred to as a front inter-vehicle distance). In this case, the setting change unit 78 sets the traveling speed of the subject vehicle Am to be slightly smaller than the traveling speed of the preceding vehicle Af.

On the other hand, when only the departure of the following vehicle Ab is detected as in the first departure scene Sn1 (see FIG. 4) and the second departure scene Sn2 (see FIG. 5), the setting change unit 78 controls the travel so as to increase a space between the following vehicle Ab and the subject vehicle Am (hereinafter, referred to as a rear inter-vehicle distance). In this case, the setting change unit 78 sets the traveling speed of the subject vehicle to be slightly larger than the traveling speed of the following vehicle Ab.

Further, when both the preceding vehicle Af and the following vehicle Ab depart as in the third departure scene Sn3 (see FIG. 6) and the fourth departure scene Sn4 (see FIG. 7), the setting change unit 78 controls the travel of the subject vehicle Am so as to increase the front inter-vehicle distance. In this way, when both the preceding vehicle Af and the following vehicle Ab depart, the setting change unit 78 gives priority to securing the front inter-vehicle distance rather than securing the rear inter-vehicle distance.

After changing the setting of the autonomous travel control, when it is determined in the second continuation feasibility determination by the control switching unit 77 that the autonomous travel control can be continued, the setting change unit 78 continues the autonomous travel control based on the information on the lane markings BL1 and BL2 while maintaining the changed setting. In this case, the setting change unit 78 returns the setting of the travel control to the state before the change based on elimination of the departure of the surrounding vehicle. On the other hand, when it is determined, by the second continuation feasibility determination after the setting of the autonomous travel control is changed, that the autonomous travel control cannot be continued, the setting change unit 78 coordinates with the control switching unit 77 to end the autonomous travel control. In this case, the autonomous driving level of the subject vehicle Am is changed from Level 3 to Level 1 or Level 0 (manual driving).

Next, details of departure handling processing including the execution of the interruption avoidance control described above will be described below based on FIG. 8 with reference to FIGS. 1 to 7. The departure handling processing is started based on activation of the autonomous travel control, and is continuously performed by the autonomous driving ECU 50b until the autonomous travel control ends.

In S11 of the departure handling processing, the other-vehicle grasping unit 73 detects departure of the preceding vehicle Af and the following vehicle Ab based on recognition of a traveling environment by the environment recognition unit 62. In S12, it is determined whether departure of the preceding vehicle Af or the following vehicle Ab is detected in S11 immediately before S12. When it is determined in S12 that neither the preceding vehicle Af nor the following vehicle Ab departs, the process returns to S11, and monitoring of departure occurrence of the preceding vehicle Af and the following vehicle Ab is continued. On the other hand, when departure of at least one of the preceding vehicle Af and the following vehicle Ab is detected in S12, the process proceeds to S13.

In S13, the information coordination unit 61 outputs an execution request for the departure occurrence notification to the HCU 100. The presentation control unit 88 performs the departure occurrence notification based on the execution request acquired by the information coordination unit 82.

With the departure occurrence notification, an occupant such as the driver is notified that departure occurs around the subject vehicle and which surrounding vehicle is the surrounding vehicle that departs. The departure occurrence notification is performed using, for example, a status image constantly displayed on the meter display 21. The status image is formed with a subject vehicle icon as a center. The departure occurrence notification is performed by a display change in which an other-vehicle icon indicating the departing surrounding vehicle is added to the status image. The driver grasps the occurrence of the departure of the surrounding vehicle and a relative position of the departing surrounding vehicle, from the other-vehicle icon displayed in association with the subject vehicle icon.

In S14, the control switching unit 77 determines whether the autonomous travel control (autonomous driving level 3) can be continued, based on information on currently recognized left and right lane markings BL1 and BL2. When it is determined, by the first continuation feasibility determination of S14, that the autonomous travel control can be continued, the process proceeds to S21, and the continuation of the autonomous travel control is determined. Accordingly, the setting change unit 78 continues the autonomous travel control based on the information on the lane markings BL1 and BL2. At this time, the setting change unit 78 does not substantially change the setting of the autonomous travel control.

On the other hand, when it is determined, by the continuation feasibility determination of S14, that the autonomous travel control based on the information on the lane markings BL1 and BL2 cannot be continued at present, the process proceeds to S15. In S15, the information coordination unit 61 outputs an execution request for the control change notification to the HCU 100. The presentation control unit 88 performs the control change notification based on the execution request acquired by the information coordination unit 82.

The control change notification is started before parameter adjustment of the travel control that is performed by the setting change unit 78. With the control change notification, an occupant such as the driver is notified that the travel control of the subject vehicle Am is changed and a change occurs in the position or the like of the subject vehicle Am inside the subject vehicle lane Lns. As an example, in the status image on the meter display 21, animation display such as moving the other-vehicle icon away from the subject vehicle icon is presented as the control change notification.

In S16, the other-vehicle grasping unit 73 determines whether the departure occurs in both the preceding vehicle Af and the following vehicle Ab. When it is determined in S16 that the departure occurs in only one of the preceding vehicle Af and the following vehicle Ab, the process proceeds to S17. In S17, the setting change unit 78 adjusts the traveling speed of the subject vehicle Am so as to secure an inter-vehicle distance to the surrounding vehicle that departs. When only the following vehicle Ab departs as in the first departure scene Sn1 and the second departure scene Sn2, the rear inter-vehicle distance is increased while preventing the subject vehicle from coming too close to the preceding vehicle Af.

On the other hand, when it is determined in S16 that the departure occurs in both the preceding vehicle Af and the following vehicle Ab, the process proceeds to S18. In S18, the setting change unit 78 adjusts the traveling speed of the subject vehicle Am so as to secure the front inter-vehicle distance. When both the preceding vehicle Af and the following vehicle Ab depart as in the third departure scene Sn3 and the fourth departure scene Sn4, the subject vehicle Am decelerates to gradually get away from the preceding vehicle Af.

In S19, the control switching unit 77 determines again whether the autonomous travel control based on the information on the left and right lane markings BL1 and BL2 can be continued by the travel control in S17 or S18 immediately before S19. When it is determined, by the continuation feasibility redetermination of S19, that the autonomous travel control cannot be continued, the process proceeds to S20. In S20, it is determined to interrupt the autonomous travel control, and the current departure handling processing is ended.

On the other hand, when it is determined, by the continuation feasibility redetermination of S19, that the autonomous travel control can be continued, the process proceeds to S21. In S21, it is determined to continue the autonomous travel control, and the current departure handling processing is ended. In this case, the subject vehicle Am continues traveling according to the autonomous travel control based on the information on the lane markings BL1 and BL2 while maintaining a state of being more distant than usual from the surrounding vehicle that departs.

In the first embodiment described above, even when the departure occurs in the preceding vehicle Af or the following vehicle Ab in the state where the subject vehicle Am is traveling according to the autonomous travel control, as long as the autonomous travel control based on the information on the lane markings BL1 and BL2 can be continued, the autonomous travel control is continued. According to the above, the interruption of the autonomous travel control caused by a change in behavior of the preceding vehicle Af, the following vehicle Ab, or the like can be reduced. That is, in a departure scene or the like where the preceding vehicle Af, the following vehicle Ab, and the like are traveling abnormally, a situation in which the autonomous travel control of the subject vehicle Am is interrupted due to the influence of the surrounding vehicles is avoided. As a result, it is possible to use the autonomous driving, in which the driver has no surroundings monitoring obligation, for a longer time, and thus it is possible to secure the convenience of the autonomous driving.

In addition, in the first embodiment, when only one of the preceding vehicle Af and the following vehicle Ab traveling in front of and behind the subject vehicle Am departs, the travel of the subject vehicle Am is controlled so as to increase the space between the subject vehicle Am and the one surrounding vehicle that deviates. As described above, according to the travel control of moving away from the departing surrounding vehicle, the recognition of the lane markings BL1 and BL2 is less likely to be blocked by the surrounding vehicle in a departure state. According to the above, since the autonomous travel control based on the information on the lane markings BL1 and BL2 is easily continued, the convenience of the autonomous driving can be further improved.

In the first embodiment, when the preceding vehicle Af traveling in front of the subject vehicle Am departs, the travel of the subject vehicle Am is controlled so as to increase the space (front inter-vehicle distance) between the preceding vehicle Af and the subject vehicle Am. According to the above, since the recognition of the shapes of the lane markings BL1 and BL2 in the traveling direction is less likely to be obstructed by the preceding vehicle Af, the autonomous travel control based on the information on the lane markings BL1 and BL2 is easily continued. As a result, the convenience of the autonomous driving can be further improved.

Further, in the first embodiment, when both the preceding vehicle Af and the following vehicle Ab traveling in front of and behind the subject vehicle Am depart, the travel of the subject vehicle Am is controlled so as to increase the space (front inter-vehicle distance) between the preceding vehicle Af and the subject vehicle Am. According to the above, the recognition of the shapes of the lane markings BL1 and BL2 in the traveling direction is less likely to be obstructed by the preceding vehicle Af.

In addition, the deceleration of the subject vehicle Am for getting away from the preceding vehicle Af may also prompt the following vehicle Ab to decelerate. When the space (rear inter-vehicle distance) between the following vehicle Ab and the subject vehicle Am is increased due to the deceleration of the following vehicle Ab, it is easy to grasp the rear lane markings BL1 and BL2. As described above, according to the control in which the securing of the front inter-vehicle distance is prioritized, the autonomous travel control based on the information on the lane markings BL1 and BL2 is easily continued, and thus the convenience of the autonomous driving can be secured.

In addition, in the first embodiment, the departure occurrence notification indicating the departure of the surrounding vehicle and the control change notification indicating the change of the traveling position of the subject vehicle Am are performed by the coordination of the information coordination units 61 and 82. Therefore, an occupant such as the driver can easily grasp the occurrence of the departure of the surrounding vehicle and a change schedule of the traveling position of the subject vehicle Am due to the departure even in a state where there is no surroundings monitoring obligation. According to the above, since it is possible to reduce uneasiness about the autonomous travel control, it is possible to improve the convenience of the autonomous driving felt by the driver in conjunction with the interruption avoidance control of the autonomous travel control.

Further, in the first embodiment, when the following vehicle Ab departs in the direction approaching the subject vehicle Am, the departure occurrence notification indicating the approaching of the following vehicle Ab is performed. In this way, by indicating to the driver or the like that the monitoring of the surrounding vehicle is correctly performed, confidence in the autonomous driving function can be improved.

In the first embodiment, the information coordination unit 61 corresponds to a "notification control unit", the lane grasping unit 72 corresponds to a "lane marking recognition unit", the other-vehicle grasping unit 73 corresponds to a "departure determination unit", the control switching unit 77 corresponds to a "continuation determination unit", and the setting change unit 78 corresponds to a "control continuation unit". Further, the autonomous driving ECU 50b corresponds to the "autonomous driving control device".

Second Embodiment

A second embodiment according to the present disclosure is a modification of the first embodiment. In the second embodiment, even when departure occurs in a surrounding vehicle, a traveling position of the subject vehicle Am is adjusted in order to secure reliability of the recognition of the lane markings BL1 and BL2 on an assumption that the autonomous travel control is continued. Hereinafter, details of position adjustment control based on the other-vehicle grasping unit 73 and the setting change unit 78 according to the second embodiment will be described based on FIGS. 9 to 12 with reference to FIGS. 1 to 3.

The other-vehicle grasping unit 73 detects protrusion of a surrounding vehicle from the subject vehicle lane Lns in addition to departure of the surrounding vehicle inside the subject vehicle lane Lns. When the surrounding vehicle crosses either the left lane marking BL1 or the right lane marking BL2 and at least a part of the surrounding vehicle is located outside the subject vehicle lane Lns, the other-vehicle grasping unit 73 determines that the surrounding vehicle protrudes from the subject vehicle lane Lns. The other-vehicle grasping unit 73 estimates that the surrounding vehicle protruding from the subject vehicle lane Lns is, for example, a vehicle that is changing lanes from the subject vehicle lane Lns to an adjacent lane.

When departure of only one of surrounding vehicles in front of and behind the subject vehicle is detected, the setting change unit 78 performs travel control of moving in a direction away from the surrounding vehicle in the departure state as in the first embodiment. At this time, the traveling position of the subject vehicle Am in the left-right direction is substantially not changed before and after the detection of the departure, and is maintained at substantially a center of the subject vehicle lane Lns.

The setting change unit 78 determines the traveling position of the subject vehicle Am in the left-right direction according to traveling positions of the preceding vehicle Af and the following vehicle Ab in the left-right direction when both the surrounding vehicles in front of and behind the subject vehicle Am depart. The setting change unit 78 changes the traveling position of the subject vehicle Am in the left-right direction inside the subject vehicle lane Lns between a position in a case where departure directions of left and right of the preceding vehicle Af and the following vehicle Ab are the same and a position in a case where the departure directions of left and right of the preceding vehicle Af and the following vehicle Ab are different from each other.

Specifically, when the preceding vehicle Af and the following vehicle Ab depart in the same direction of left or right (left direction) as in the third departure scene Sn3 (see FIG. 9), the setting change unit 78 causes the subject vehicle Am to follow the surrounding vehicle in the traveling position inside the subject vehicle lane Lns. That is, the setting change unit 78 shifts the traveling position of the subject vehicle Am in the same direction of left or right (left direction in FIG. 9) as the preceding vehicle Af and the following vehicle Ab. The setting change unit 78 continues the autonomous travel control in a state where the subject vehicle Am is closer to the left lane marking BL1, until the departure of at least one of the preceding vehicle Af and the following vehicle Ab is eliminated.

On the other hand, when the departure directions of left and right of the preceding vehicle Af and the following vehicle Ab are different from each other as in the fourth departure scene Sn4 (see FIG. 10), the setting change unit 78 adjusts the traveling position of the subject vehicle Am inside the subject vehicle lane Lns to the middle of the surrounding vehicles, which are in front of and behind the subject vehicle Am, in the left-right direction. In the fourth departure scene Sn4, the setting change unit 78 may set the traveling position of the subject vehicle Am to substantially the center of the subject vehicle lane Lns, in other words, to the middle between the left and right lane markings BL1 and BL2.

For example, when at least one (the following vehicle Ab in FIG. 11) of the surrounding vehicles in front of and behind the subject vehicle protrudes from the subject vehicle lane Lns as in a fifth departure scene Sn5 (see FIG. 11), the setting change unit 78 stops changing the traveling position. In this case, the setting change unit 78 sets the traveling position of the subject vehicle Am to substantially the center of the subject vehicle lane Lns. As described above, the adjustment of the traveling position of the subject vehicle Am is performed only in consideration of the surrounding vehicles traveling in the subject vehicle lane Lns, and a surrounding vehicle protruding from the subject vehicle lane Lns is substantially excluded from departure detection targets.

Next, details of departure handling processing including the execution of the position adjustment control described above will be described below based on FIG. 12 with reference to FIGS. 1 to 3 and 9 to 11. Similarly to the first embodiment, the departure handling processing according to the second embodiment is started based on activation of the autonomous travel control, and is continuously performed by the autonomous driving ECU 50b until the autonomous travel control ends. When it is determined that continuation of the autonomous travel control after the traveling position adjustment by the position adjustment control is difficult, the action determination unit 63 can determine to perform the driving takeover to the driver.

In S211 and S212, as in S11 and S12 (see FIG. 8) of the first embodiment, the other-vehicle grasping unit 73 monitors departure of the preceding vehicle Af and the following vehicle Ab. When departure of at least one of the preceding vehicle Af and the following vehicle Ab is detected, the processing of S213 is performed.

In S213, the information coordination unit 61 outputs an execution request for the departure occurrence notification and the control change notification to the HCU 100. The presentation control unit 88 sequentially performs the departure occurrence notification and the control change notification based on the execution request acquired by the information coordination unit 82. When a traveling position of the subject vehicle Am changes by the left-right direction in the position adjustment control described later, animation display such as bringing a lane line icon close to the subject vehicle icon may be presented in the status image on the meter display 21 as the control change notification.

In S214, the other-vehicle grasping unit 73 determines whether departure occurs in both the preceding vehicle Af and the following vehicle Ab. When it is determined in S214 that the departure occurs in only one of the preceding vehicle Af and the following vehicle Ab, the process proceeds to S215. In S215, the setting change unit 78 adjusts the traveling speed of the subject vehicle Am so as to secure an inter-vehicle distance to the surrounding vehicle that departs. The subject vehicle Am continues traveling according to the autonomous travel control in a state where the front inter-vehicle distance is secured than usual.

On the other hand, when it is determined in S215 that the departure occurs in both the preceding vehicle Af and the following vehicle Ab, the process proceeds to S216. In S216, the other-vehicle grasping unit 73 determines whether the surrounding vehicle having departed protrudes to the outside of the subject vehicle lane Lns. When it is determined in S216 that at least one of the preceding vehicle Af and the following vehicle Ab protrudes to the outside of the subject vehicle lane Lns (see FIG. 11), the process proceeds to S217. In S217, the setting change unit 78 sets the traveling position of the subject vehicle Am to substantially the center of the subject vehicle lane Lns and continues the autonomous travel control.

When it is determined in S216 that neither the preceding vehicle Af nor the following vehicle Ab protrudes from the subject vehicle lane Lns, the process proceeds to S218. In S218, the other-vehicle grasping unit 73 determines departure directions of the preceding vehicle Af and the following vehicle Ab. When it is determined in S218 that the preceding vehicle Af and the following vehicle Ab depart in the same direction, the process proceeds to S219. In S219, the setting change unit 78 continues the autonomous travel control by offsetting the traveling position of the subject vehicle Am in the same direction as the departure direction of the preceding vehicle Af and the following vehicle Ab (see FIG. 9).

On the other hand, when it is determined in S218 that the preceding vehicle Af and the following vehicle Ab depart in different directions, the process proceeds to S220. In S220, the setting change unit 78 controls the traveling position of the subject vehicle Am to a position that is the middle of the preceding vehicle Af and the following vehicle Ab in the left-right direction (see FIG. 10), and continues the autonomous travel control.

In the second embodiment described above, when both the preceding vehicle Af and the following vehicle Ab depart, the position of the subject vehicle Am in the left-right direction inside the subject vehicle lane Lns is changed between the position in the case where the departure directions of left and right are the same and the position in the case where the departure directions of left and right are different from each other. According to the above, since a surrounding condition necessary for the autonomous travel control can be grasped, the interruption of the autonomous travel control can be reduced. As a result, it is possible to use the autonomous driving, in which the driver has no surroundings monitoring obligation, for a longer time, and thus it is possible to secure the convenience of the autonomous driving.

In addition, in the second embodiment, when the preceding vehicle Af and the following vehicle Ab depart in the same direction, the setting change unit 78 shifts the traveling position of the subject vehicle Am inside the subject vehicle lane Lns in the same direction as the departure direction of the preceding vehicle Af and the following vehicle Ab. In this way, according to the control of offsetting the subject vehicle Am in the same direction as the surrounding vehicles in front of and behind the subject vehicle Am, it is possible to reduce the feeling of discomfort of an occupant such as the driver.

In the second embodiment, when the preceding vehicle Af and the following vehicle Ab depart in different directions, the setting change unit 78 adjusts the traveling position of the subject vehicle Am inside the subject vehicle lane Lns to the position that is the middle of the preceding vehicle Af and the following vehicle Ab in the left-right direction. According to such position adjustment, information acquired from the front and the rear of the subject vehicle Am is combined, and the information on the left and right lane markings BL1 and BL2 is easily grasped. As a result, the interruption of the autonomous travel control is less likely to occur, and thus the convenience of the autonomous driving can be improved.

Further, in the second embodiment, when at least one of the preceding vehicle Af and the following vehicle Ab protrudes from the subject vehicle lane Lns, the setting change unit 78 stops changing the traveling position of the subject vehicle Am. The surrounding vehicle protruding from the subject vehicle lane Lns may be a vehicle that is changing lanes. Therefore, a large change in the traveling position is reduced by excluding the surrounding vehicle, which is changing lanes, at an early stage from the targets used for the adjustment of the traveling position. As a result, the travel according to the autonomous travel control becomes smooth, and thus the convenience of the autonomous driving can be improved.

Other Embodiments

Although the multiple embodiments according to the present disclosure have been described above, the present disclosure is not construed as being limited to the above-described embodiments, and can be applied to various embodiments and combinations within a range not departing from the spirit of the present disclosure.

Figure 13:
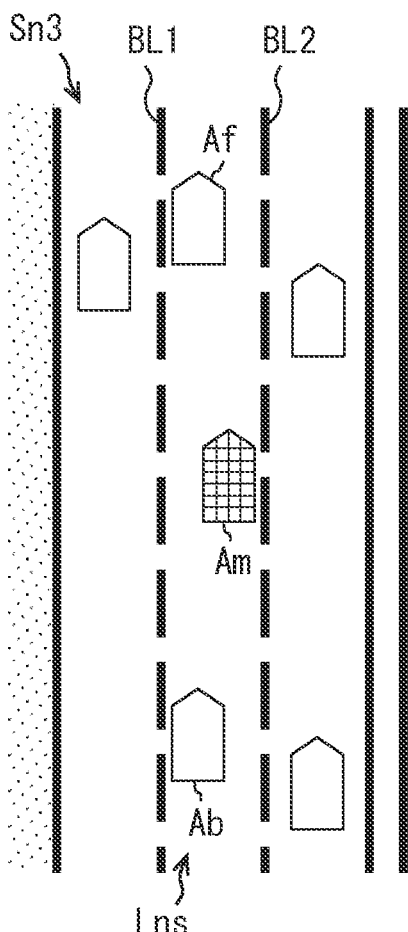
FIG. 13 is a diagram for explaining position adjustment control in the third departure scene performed in a first modification.

In a first modification of the second embodiment, in the third departure scene Sn3 (see FIG. 13) in which surrounding vehicles in front of and behind the subject vehicle Am depart in the same direction, position adjustment control is performed to shift a traveling position of the subject vehicle Am inside the subject vehicle lane Lns in a direction opposite to the departure direction of the surrounding vehicles in a left-right direction. For example, when both the preceding vehicle Af and the following vehicle Ab depart in a left direction, the subject vehicle Am continues traveling with autonomous travel control in a state where the subject vehicle Am is offset in a right direction inside the subject vehicle lane Lns. In the first modification, by performing the control of offsetting to an opposite side with respect to the departure direction of the surrounding vehicles in front of and behind the subject vehicle, recognition of the lane markings BL1 and BL2 is less likely to be obstructed by the surrounding vehicles. As a result, long duration of traveling according to the autonomous travel control can be secured.

In a second modification of the first embodiment, substantially the same travel control as the position adjustment control in the second embodiment is performed by interruption avoidance control of departure handling processing. Specifically, when it is determined that surrounding vehicles in front of and behind the subject vehicle Am both depart (see S14: YES in FIG. 8), substantially the same processing as the processing of S216 to S220 in the second embodiment is performed. After a traveling position of the subject vehicle Am is adjusted, the control switching unit 77 performs continuation feasibility redetermination (see S19 in FIG. 8). As described above, adjustment of offsetting the traveling position of the subject vehicle Am in a left-right direction may be performed as the interruption avoidance control.

Further, in a third modification of the above-described embodiments, even in a departure scene in which only one of the preceding vehicle Af and the following vehicle Ab departs, interruption avoidance control or position adjustment control of offsetting in a left-right direction is performed.

In a fourth modification of the above-described embodiments, in the third departure scene Sn3 in which surrounding vehicles in front of and behind the subject vehicle Am depart in different directions in a left-right direction, a traveling position of the subject vehicle Am is adjusted in a direction opposite to a departure direction of the preceding vehicle Af. In a fifth modification of the above-described embodiments, in the third departure scene Sn3 in which surrounding vehicles in front of and behind the subject vehicle Am depart in different directions of left and right, a traveling position of the subject vehicle Am is adjusted in the same direction as the preceding vehicle Af.

The setting change unit 78 according to a sixth modification of the above-described embodiments can continue autonomous travel control using only information on one of the left and right lane markings BL1 and BL2. The other-vehicle grasping unit 73 according to a seventh modification of the above-described embodiments determines departure of a surrounding vehicle traveling in an adjacent lane. The setting change unit 78 according to the seventh modification adjusts a traveling position of the subject vehicle Am such that the subject vehicle Am moves away from a surrounding vehicle in a departure state in the adjacent lane.

In an eighth modification of the above-described embodiments, departure in a left-right direction of a surrounding vehicle is detected while detection of departure in a front-rear direction of a surrounding vehicle is not performed. In contrast, in a ninth modification of the above-described embodiments, departure in a front-rear direction of a surrounding vehicle is detected while detection of departure in a left-right direction of a surrounding vehicle is not performed. As in the eighth and ninth modifications described above, departure to be detected of vehicles in front of and behind the subject vehicle may be departure in only one of the front-rear direction and the left-right direction.

The departure handling processing of the above-described embodiments may be performed exclusively during the autonomous travel according to the traffic congestion scene level 3, or may be performed during autonomous travel of both the traffic congestion scene level 3 and the area level 3.

The modes of the departure occurrence notification and the control change notification in the above-described embodiments may be appropriately changed. As an example, the presentation control unit 88 may use a display device different from the meter display 21 and the ambient light 25 for the departure occurrence notification and the control change notification. For example, virtual image display by the HUD 23 may be used for the control change notification. Further, a display color, a display size, display luminance, animation, presence or absence of blinking, and the like of contents used for the departure occurrence notification and the control change notification may be appropriately changed. In addition, reproduction of a voice message may be performed as the departure occurrence notification and the control change notification.

In a tenth modification of the above-described embodiments, functions of the driving support ECU 50a and the autonomous driving ECU 50b are provided by one autonomous driving ECU. That is, the function of the driving support ECU 50a is implemented in the autonomous driving ECU 50b according to the tenth modification. In the tenth modification, the integrated autonomous driving ECU corresponds to the "autonomous driving control device". In addition, a system including multiple ECUs with the autonomous driving ECU 50b as a main constituent may correspond to the "autonomous driving control device". Further, a function of the HCU 100 may be further implemented in the autonomous driving ECU. In this embodiment, the presentation control unit 88 corresponds to the "notification control unit".

In the above-described embodiments, the functions provided by the driving support ECU, the autonomous driving ECU, and the HCU can be provided by software and hardware for executing the software, only software, only hardware, or a composite combination thereof. Further, when providing the functions by an electronic circuit serving as hardware, the functions can be provided by a digital circuit including a large number of logic circuits or by an analog circuit.

Each processing unit in the above-described embodiments is hardware for arithmetic processing in cooperation with the RAM. The processing unit includes at least one arithmetic core such as a central processing unit (CPU) and a graphics processing unit (GPU). The processing unit may further include a field-programmable gate array (FPGA), a neural network processing unit (NPU), an IP core having another dedicated function, and the like. The processing unit according to the above-described embodiments may be individually mounted on a printed circuit board, or may be mounted on an application specific integrated circuit (ASIC), an FPGA, or the like.

A form of a storage medium (a non-transitory tangible computer-readable medium, that is, a non-transitory tangible storage medium) that stores various programs and the like may also be appropriately changed. The storage medium is not limited to a configuration provided on a circuit board, and may be provided in a form of a memory card or the like, inserted into a slot portion, and electrically connected to a control circuit of the autonomous driving ECU or the HCU. Further, the storage medium may be an optical disk, a hard disk drive or the like serving as a copy source or distribution source of a program to the autonomous driving ECU or the HCU.

The vehicle on which the autonomous driving system and the HMI system are mounted is not limited to a general private passenger vehicle, and may be a rental vehicle, a manned taxi vehicle, a ride-sharing vehicle, a cargo vehicle, a bus, or the like. The vehicle on which the autonomous driving system and the HMI system are mounted may be a right-hand drive vehicle or a left-hand drive vehicle. Further, a traffic environment in which the vehicle travels may be a traffic environment in which left-hand traffic is the norm or a traffic environment in which right-hand traffic is the norm. The information presentation control and the autonomous driving control according to the present disclosure may be optimized as appropriate in accordance with the road traffic law of each country and region, the steering wheel position of the vehicle, and the like.

The control unit and the method thereof described in the present disclosure may be implemented by a dedicated computer constituting a processor programmed to execute one or multiple functions embodied by a computer program. Alternatively, the device and the method thereof according to the present disclosure may be implemented by a dedicated hardware logic circuit. Alternatively, the device and the method thereof according to the present disclosure may be implemented by one or more dedicated computers implemented by a combination of a processor that executes a computer program and one or more hardware logic circuits. The computer program may be stored in a non-transitory tangible computer-readable recording medium as an instruction to be executed by a computer.

What is claimed is:

1. An autonomous driving control device configured to allow a subject vehicle to travel with autonomous travel control in which a driver has no surroundings monitoring obligation, the autonomous driving control device comprising:

at least one of (i) a circuit and (ii) a processor with a memory storing computer program code executable by the processor, the at least one of the circuit and the processor configured to cause the autonomous driving control device to:

determine departure of surrounding vehicles traveling in front of and behind the subject vehicle in a subject vehicle lane in which the subject vehicle travels;

change a position of the subject vehicle in a left-right direction inside the subject vehicle lane between a position in a case where both surrounding vehicles traveling in front of and behind the subject vehicle depart and where departure directions of left and right of the surrounding vehicles are the same and a position in a case where both the surrounding vehicles traveling in front of and behind the subject vehicle depart and where departure directions of left and right of the surrounding vehicles are different from each other, and continue the autonomous travel control; and (i) when it has been determined that the surrounding vehicles traveling in front of and behind the subject vehicle depart in different directions, adjust the position of the subject vehicle inside the subject vehicle lane to a middle of the surrounding vehicles traveling in front of and behind the subject vehicle in the left-right direction, and (ii) when it has been determined that the surrounding vehicles traveling in front of and behind the subject vehicle depart in the same direction, shift the position of the subject vehicle inside the subject vehicle lane in the same direction as the departure directions of the surrounding vehicles, or shift the position of the subject vehicle inside the subject vehicle lane in a direction opposite to the departure directions of the surrounding vehicles in the left-right direction.

2. The autonomous driving control device according to claim 1, wherein the at least one of the circuit and the processor is further configured to cause the autonomous driving control device to, when at least one of the surrounding vehicles protrudes from the subject vehicle lane, stop changing the position of the subject vehicle.

3. The autonomous driving control device according to claim 1, further comprising:

the at least one of the circuit and the processor is further configured to cause the autonomous driving control device to perform notification indicating departure of the surrounding vehicle and notification indicating a change in position of the subject vehicle due to departure of the surrounding vehicle.

4. The autonomous driving control device according to claim 3, wherein the at least one of the circuit and the processor is further configured to cause the autonomous driving control device to, when the surrounding vehicle traveling behind the subject vehicle departs in a direction of approaching the subject vehicle, perform notification indicating approaching of the surrounding vehicle traveling behind the subject vehicle.

5. A non-transitory computer readable medium storing a computer program configured to allow a subject vehicle to travel with autonomous travel control in which a driver has no surroundings monitoring obligation, the computer program comprising instructions configured to, when executed by at least one processor, to cause the at least one processor to:

determine departure of surrounding vehicles traveling in front of and behind the subject vehicle in a subject vehicle lane in which the subject vehicle travels; and change a position of the subject vehicle in a left-right direction inside the subject vehicle lane between a position in a case where both surrounding vehicles traveling in front of and behind the subject vehicle depart and where departure directions of left and right of the surrounding vehicles are the same, and a position in a case where both the surrounding vehicles traveling in front of and behind the subject vehicle depart and where departure directions of left and right of the surrounding vehicles are different from each other; and continue the autonomous travel control, i) when it has been determined that the surrounding vehicles traveling in front of and behind the subject vehicle depart in different directions, adjust the position of the subject vehicle inside the subject vehicle lane to a middle of the surrounding vehicles traveling in front of and behind the subject vehicle in the left-right direction, and ii) when it has been determined that the surrounding vehicles traveling in front of and behind the subject vehicle depart in the same direction, shift the position of the subject vehicle inside the subject vehicle lane in the same direction as the departure directions of the surrounding vehicles, or shift the position of the subject vehicle inside the subject vehicle lane in a direction opposite to the departure directions of the surrounding vehicles in the left-right direction.

6. An autonomous driving control device configured to allow a subject vehicle to travel with autonomous travel control in which a driver has no surroundings monitoring obligation, the autonomous driving control device comprising:

a departure determination unit configured to determine departure of surrounding vehicles traveling in front of and behind the subject vehicle in a subject vehicle lane in which the subject vehicle travels; and a control continuation unit configured to change a position of the subject vehicle in a left-right direction inside the subject vehicle lane between a position in a case where both surrounding vehicles traveling in front of and behind the subject vehicle depart and where departure directions of left and right of the surrounding vehicles are the same and a position in a case where both the surrounding vehicles traveling in front of and behind the subject vehicle depart and where departure directions of left and right of the surrounding vehicles are different from each other, and continue the autonomous travel control, wherein the control continuation unit is further configured to i) when it has been determined that the surrounding vehicles traveling in front of and behind the subject vehicle depart in different directions, adjust the position of the subject vehicle inside the subject vehicle lane to a middle of the surrounding vehicles travelling in front of and behind the subject vehicle in the left-right direction, and ii) when it has been determined that the surrounding vehicles traveling in front of and behind the subject vehicle depart in the same direction, shift the position of the subject vehicle inside the subject vehicle lane in the same direction as the departure directions of the surrounding vehicles, or shift the position of the subject vehicle inside the subject vehicle lane in a direction opposite to the departure directions of the surrounding vehicles in the left-right direction.

* * * * *